United States Patent
Ahmed

(10) Patent No.: US 12,062,977 B2
(45) Date of Patent: Aug. 13, 2024

(54) ELECTRICAL CONVERSION APPARATUS FOR CURRENT SHAPING

(71) Applicant: Pulsiv Limited, Cambridge (GB)

(72) Inventor: Mohammed Ahmed, Cambridge (GB)

(73) Assignee: Pulsiv Limited, Cambridge (GB)

( * ) Notice: Subject to any disclaimer, the term of this patent is extended or adjusted under 35 U.S.C. 154(b) by 58 days.

(21) Appl. No.: 17/797,021

(22) PCT Filed: Feb. 4, 2021

(86) PCT No.: PCT/EP2021/052697
§ 371 (c)(1),
(2) Date: Aug. 2, 2022

(87) PCT Pub. No.: WO2021/156382
PCT Pub. Date: Aug. 12, 2021

(65) Prior Publication Data
US 2023/0067594 A1 Mar. 2, 2023

(30) Foreign Application Priority Data
Feb. 7, 2020 (GB) ..................................... 2001703

(51) Int. Cl.
*H02M 1/42* (2007.01)
(52) U.S. Cl.
CPC ................................. *H02M 1/4266* (2013.01)
(58) Field of Classification Search
CPC .................................................. H02M 1/4266
See application file for complete search history.

(56) References Cited

U.S. PATENT DOCUMENTS

| 5,986,901 | A | 11/1999 | Weng |
| 6,141,230 | A | 10/2000 | Sum |
| 6,272,032 | B1* | 8/2001 | Franck ..................... H02M 7/06 363/126 |
| 2013/0026937 | A1 | 1/2013 | Nakajo et al. |
| 2021/0067039 | A1* | 3/2021 | Huang ..................... H02M 1/32 |
| 2022/0041074 | A1* | 2/2022 | Pfeilschifter ........... B60L 53/22 |

FOREIGN PATENT DOCUMENTS

| CN | 201919210 U | 8/2011 |
| CN | 103607108 A | 2/2014 |
| CN | 105142316 A | 12/2015 |
| CN | 206963114 U | 2/2018 |

(Continued)

OTHER PUBLICATIONS

Search report for GB Application No. GB2001703.4 dated Jul. 31, 2020.

(Continued)

*Primary Examiner* — Kyle J Moody
*Assistant Examiner* — Lakaisha Jackson
(74) *Attorney, Agent, or Firm* — Andrus Intellectual Property Law, LLP

(57) ABSTRACT

An electrical conversion apparatus for use in current shaping comprising at least two capacitors connected in series between first and second lines, a first diode connected in parallel across the first capacitor, a second diode connected in parallel across the second capacitor, and a constant current device connected in series with the first and second capacitors.

3 Claims, 2 Drawing Sheets

(56) References Cited

FOREIGN PATENT DOCUMENTS

| EP | 0602908 A1 | 6/1994 | | |
|---|---|---|---|---|
| EP | 0720276 A1 | 7/1996 | | |
| EP | 2600697 A1 | 6/2013 | | |
| JP | 32286787 A | * | 7/1989 | |
| JP | H01170364 A | | 7/1989 | |
| WO | 2009080417 A1 | | 7/2009 | |
| WO | WO-2009080417 A1 | * | 7/2009 | .......... H02M 1/4266 |

OTHER PUBLICATIONS

International Search Report and Written Opinion for International Application No. PCT/EP2021/052697, mailed Apr. 28, 2021.

Lam, John et al. A New Passive Valley Fill Dimming Electronic Ballast with Extended Line Current Conduction Angle (Annual International Telecommunication Energy Conference, 28th, IEEE, PI, Sep. 1, 2006, pp. 1-7.

Lam, John et al. A Modified Valley Fill Electronic Ballast Having a Current Source Resonant Inverter With Improved Line-Current Total Harmonic Distortion (THD), High Power Factor, and Low Lamp Crest Factor (IEEE Transactions on Industrial Electronics, IEEE Service Center, Piscataway, NJ, USA, vol. 55, No. 3, Mar. 1, 2008, pp. 1147-1159.

Office Action for European Application No. 21705892.4, mailed Mar. 7, 2024.

* cited by examiner

ELECTRICAL CONVERSION APPARATUS FOR CURRENT SHAPING

CROSS-REFERENCE TO RELATED APPLICATIONS

This application is the U.S. national stage application of International Application PCT/EP2021/052697, filed Feb. 4, 2021, which international application was published on Aug. 12, 2021, as International Publication WO 2021/156382 A1 in the English language. The International Application claims priority of Great Britain Patent Application 2001703.4, filed Feb. 7, 2020.

FIELD

This invention relates to an apparatus for use in electrical conversion, and in particular in current shaping applications, for example in shaping of the output of a rectifier.

BACKGROUND

Rectification arrangements for use in the conversion of an AC electrical output to a DC electrical output are well known. However, the current at the output of, for example, a simple bridge rectifier varies significantly, and as a consequence some form of smoothing arrangement is required to be used in conjunction with the rectifier to reduce the variation in the output current. A simple form of smoothing arrangement takes the form of a large capacitor that charges and discharges to compensate for the variations in the output current, reducing the level of variation in the output current. Such a smoothing capacitor is typically of large capacitance. By way of example, in a typical battery charger circuit for use in charging the battery of a cordless power tool, a 33 µF, 400V capacitor is often used. However, such capacitances are generally of relatively large dimensions, and are expensive, and so their use in a number of applications is undesirable. Furthermore, whilst the variations in the output current are reduced, a significant ripple may still be present, which is undesirable.

SUMMARY

It is an object of the invention to provide an electrical conversion apparatus for use in current shaping, wherein the output of the apparatus is of improved suitability for use in applications in which a load with which the apparatus is used consumes a substantially constant power.

According to the present invention there is provided an electrical conversion apparatus for use in current shaping comprising at least two capacitors connected in series between first and second lines, a first diode connected in parallel across the first capacitor, a second diode connected in parallel across the second capacitor, and a constant current device connected in series with the first and second capacitors.

Such a circuit may be used in substitution for the relatively large smoothing capacitor that is typically used. The apparatus is advantageous in that it allows each individual capacitor to be of considerably smaller capacitance than would typically be required if a smoothing capacitor were being used to perform the current shaping function.

Preferably, a third capacitor is connected in series with the first and second capacitors, and additional diodes are provided to provide charge and discharge paths to the third capacitor.

In use, such an arrangement may be used as a replacement for, for example, a 33 µF, 400V smoothing capacitor, each of the first, second and third capacitors taking the form of, for example, a 10 µF, 160V capacitor. As such capacitors are of considerably smaller dimensions and cost, it will be appreciated that the use of the invention is significantly advantageous over the use of a conventional smoothing capacitor. The number and size of capacitors used will vary depending upon space and cost requirements, and the size smoothing capacitor that is being replaced.

BRIEF DESCRIPTION OF THE DRAWINGS

The invention will further be described, by way of example, with reference to the accompanying drawings, in which.

DETAILED DESCRIPTION OF THE DRAWINGS

Figure 1:
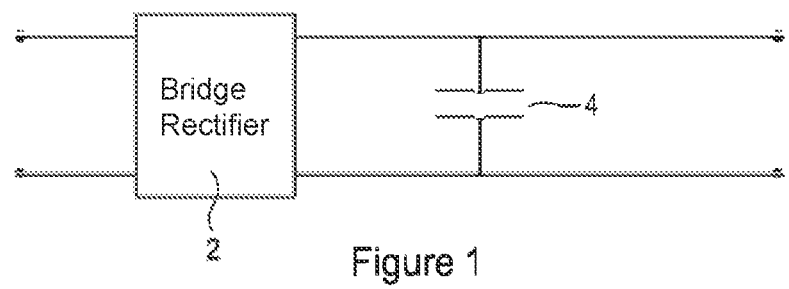
FIG. 1 is a diagrammatic view of a typical, simple current smoothing arrangement used in conjunction with a bridge rectifier.

Referring firstly to FIG. 1, an electrical conversion circuit is illustrated for converting an AC supply to a DC supply. The circuit comprises a bridge rectifier 2 and a smoothing capacitor 4 connected across the output of the bridge rectifier 2 and arranged to charge and discharge so as to smooth the DC output from the circuit. The smoothing capacitor 4 is of relatively large capacitance. By way of example, if a more complex form of the circuit shown in FIG. 1 were incorporated into a battery charger for use in charging the battery of a cordless power tool, the smoothing capacitor 4 would typically have a rating of around 33 µF, 400V. Such capacitors are of relatively large dimensions, and so may place constraints or limitations on the size of the battery charger, and they are relatively costly components. Consequently, it is desirable to avoid using them. It should be appreciated that, depending upon the application, other sizes of capacitor may be used and where these are of large capacitance, there may be a desired to avoid using them for cost and packaging reasons.

Figure 2:
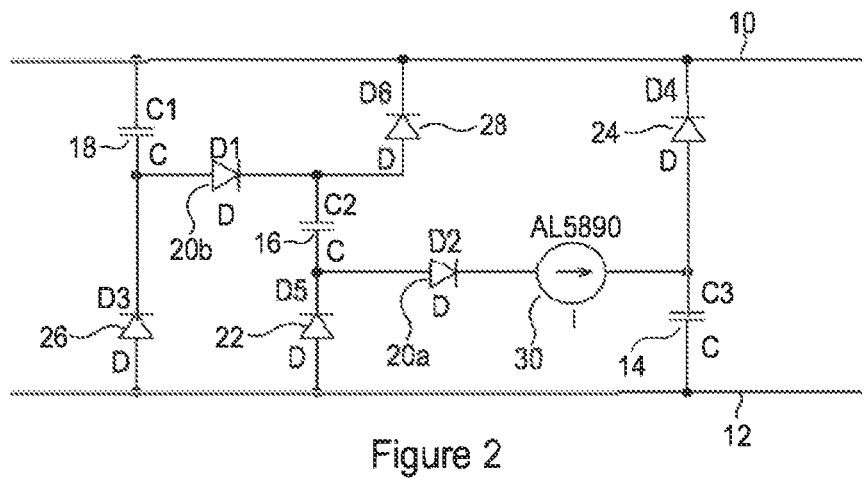
FIG. 2 is a diagrammatic view of a current shaping circuit in accordance with an embodiment of the invention.

In accordance with the invention, as shown in FIG. 2, the current shaping function achieved by the smoothing capacitor 4 may instead be undertaken by a slightly more complex circuit including a plurality of capacitors arranged in series with one another, with diodes being provided, arranged in parallel with the capacitors, to provide charge and discharge paths for the capacitors, and with a constant current device incorporated into the circuit. The circuit of FIG. 2 is intended, in use, to be a direct substitute for the smoothing capacitor 4 of the circuit of FIG. 1.

As shown in FIG. 2, the current shaping circuit comprises a first line 10 and a second line 12 connected between, for example, the output of a bridge rectifier (not shown) and a load, for example in the form of a battery charging circuit (also not shown). The circuit further comprises first, second and third capacitors 14, 16, 18 connected in series with one another and connected between the first and second lines 10, 12. Diodes 20a, 20b are provided between the first and second capacitors 14, 16 and between the second and third capacitors 16, 18. A first discharge diode 22 is connected in parallel with the first capacitor 14, between the line 12 and a point between the second capacitor 16 and the diode 20a, and a second discharge diode 24 is connected in parallel with the second capacitor 16, connected between the line 10 and a point located between the first capacitor 14 and the diode 20a. Additional discharge diodes 26, 28 are provided, connected between the lines 10, 12 and the points between the second and third capacitors 16, 18 and the diode 20b.

A constant current source or device 30 is located in the circuit, in this case between the first and second capacitors 14, 16. By way of example, it may be a 40 mA constant current source such as an AL5890.

The circuit is arranged such that the charging path is made up of the third capacitor 18, diode 20b, second capacitor 16, diode 20a, constant current source 30, and the first capacitor 14. It is important that the constant current source 30 is located somewhere within the charging path, but its precise location is not crucial and it could be located in locations other than that illustrated.

The circuit includes three discharge paths. The first discharge path is made up of the first capacitor 14 and the second discharge diode 24. The second discharge path is made up of the first discharge diode 22, the second capacitor 16 and the discharge diode 28. The third discharge path is made up of the discharge diode 26 and third capacitor 18.

Where used in substitution for a 33 µF, 400V smoothing capacitor, it is envisaged that each of the first, second and third capacitors 14, 16, 18 will take the form of a 10 µF, 160V capacitor. These capacitors are of smaller dimensions than a 33 µF, 400V smoothing capacitor and are of considerably lower cost, with the result that the component cost of the entire circuit of FIG. 2 may be half, or less, than the cost of the traditional 33 µF, 400V smoothing capacitor. It will be appreciated, therefore, that significant cost savings may be made by using the current shaping circuit of the present invention.

Whilst the three capacitors 14, 16, 18 shown in FIG. 2 are all of the same size, and this is convenient for efficient manufacture, reducing the number of different components used in the circuit, this need not be the case and capacitors of different sizes to one another may be used if desired.

Figure 3A:
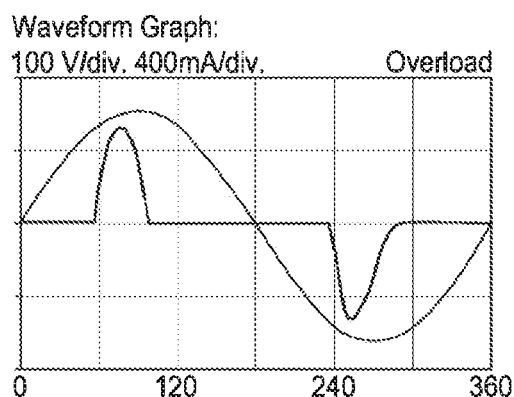
FIGS. 3a and 3b are illustrations showing certain effects of the use of the invention.
Figure 3B:
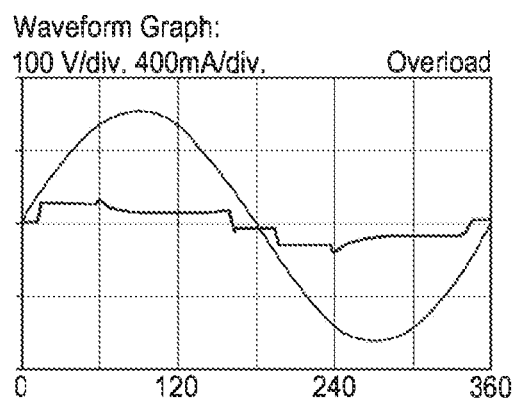

FIG. 3a illustrates the current drawn from the mains supply if a circuit of the general form shown in FIG. 1 is used, and it is apparent that the current is drawn in the form of relatively short spikes of relatively large magnitude, the spikes being spaced apart from one another. FIG. 3b illustrates the current drawn from the mains supply if a modified circuit including the current shaping circuit of FIG. 2 is used, and shows that the current is drawn over an extended period of time, and that the peak current drawn is much lower than is the case with the traditional circuit.

Figure 4A:
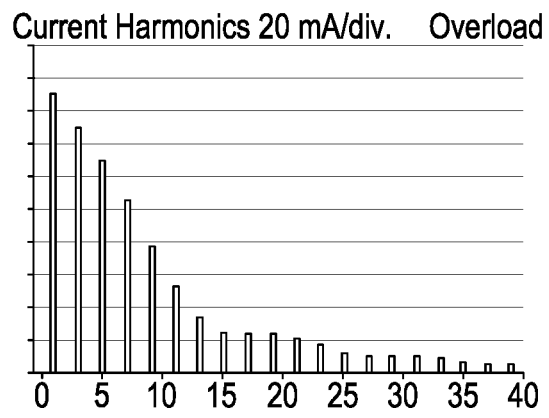
FIGS. 4a and 4b are views illustrating the effect of the invention on harmonics.
Figure 4B:
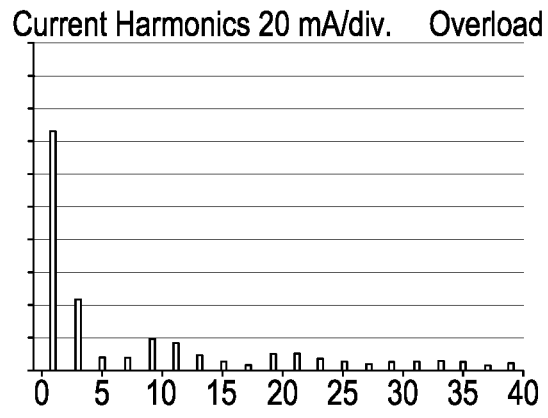

The reduced peak current and associated power factor impact upon the harmonic content arising from the use of the circuit, as illustrated by comparing FIG. 4a which shows the harmonic content of a traditional circuit with FIG. 4b that shows the harmonic content of the circuit shown in FIG. 2. Clearly, the magnitudes of the harmonics are much reduced through the use of the invention. The reduction in harmonics is advantageous in that the RMS current is reduced, leading to less copper losses. The reduction in peak current may allow a smaller common mode choke to be incorporated into the circuit, and this, too, can lead to component cost savings.

Figure 5:
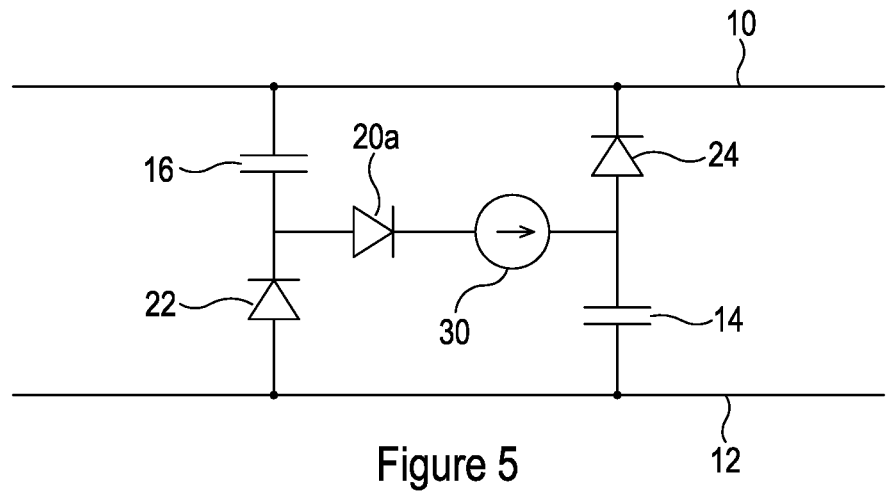
FIG. 5 is a view illustrating an alternative to the circuit of FIG. 2.

Whilst FIG. 2 illustrates a current shaping circuit in which three capacitors are present, a greater number, or fewer, may be provided to suit the application in which the invention is to be used, and the size capacitor to be replaced. By way of example, FIG. 5 illustrates a circuit including just two capacitors, along with the associated diodes and constant current source. This circuit functions in substantially the manner of the circuit of FIG. 2.

Whilst specific embodiments of the invention have been described hereinbefore, it will be appreciated that a number of modifications and alterations may be made thereto without departing from the scope of the invention as defined by the appended claims.

The invention claimed is:

1. An electrical conversion apparatus for use in current shaping comprising:
   a bridge rectifier having an input side and an output side; and
   a current-shaping circuit arranged in parallel with the output side of the bridge rectifier, the current-shaping circuit comprising:
      a first capacitor and a second capacitor connected in series between first and second lines connected to the output side of the bridge rectifier;
      a first diode connected in parallel across the first capacitor;
      a second diode connected in parallel across the second capacitor;
      a constant current device connected in series with the first and second capacitors;
      a third capacitor connected in series with the first and second capacitors; and
      additional diodes to provide charge and discharge paths to the third capacitor.

2. The apparatus of claim 1, wherein the first, second, and third capacitors each have a capacitance of less than 33 microfarads.

3. The apparatus of claim 1, wherein the current-shaping circuit further comprises a common mode choke.

* * * * *